July 22, 1941.  W. H. NICHOLOY  2,250,116
PROCESS AND APPARATUS FOR TREATING FOOD MATERIALS
Filed Dec. 17, 1937  3 Sheets-Sheet 3
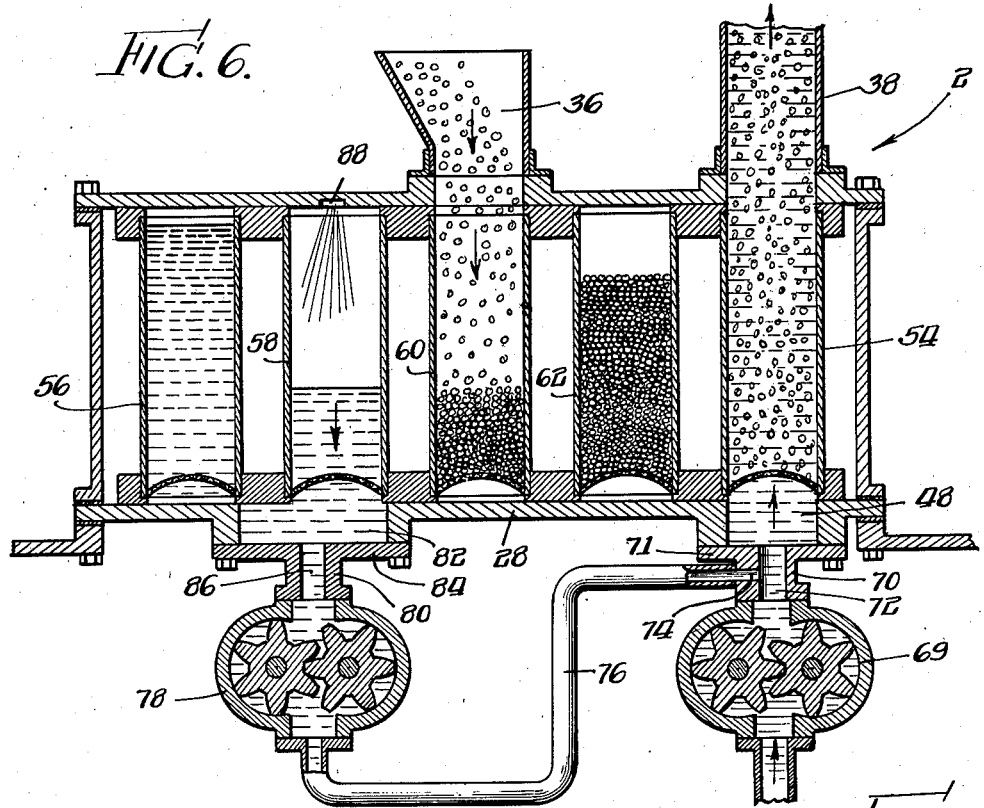
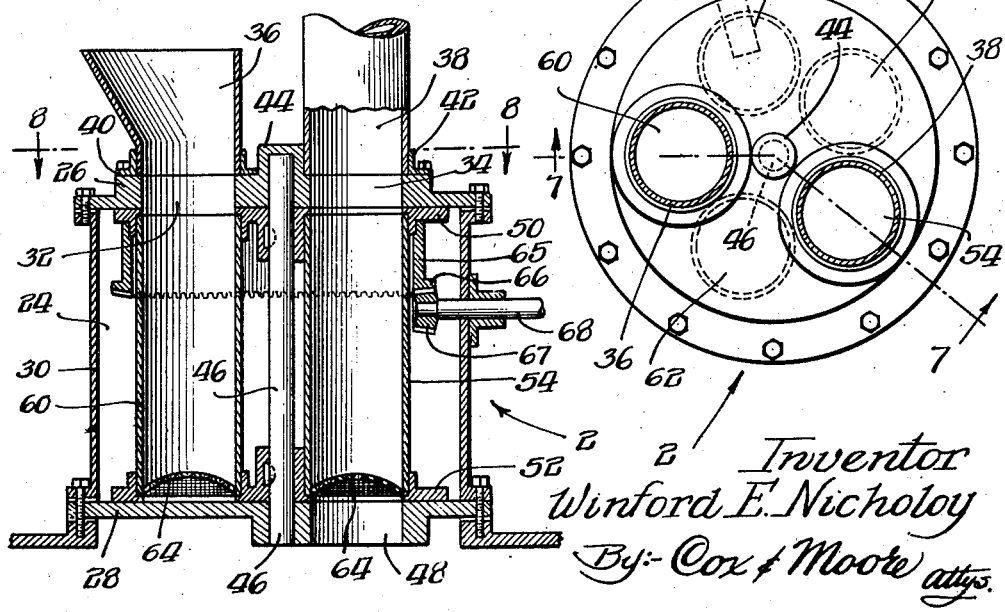
Inventor
Winford E. Nicholoy
By:- Cox & Moore attys.

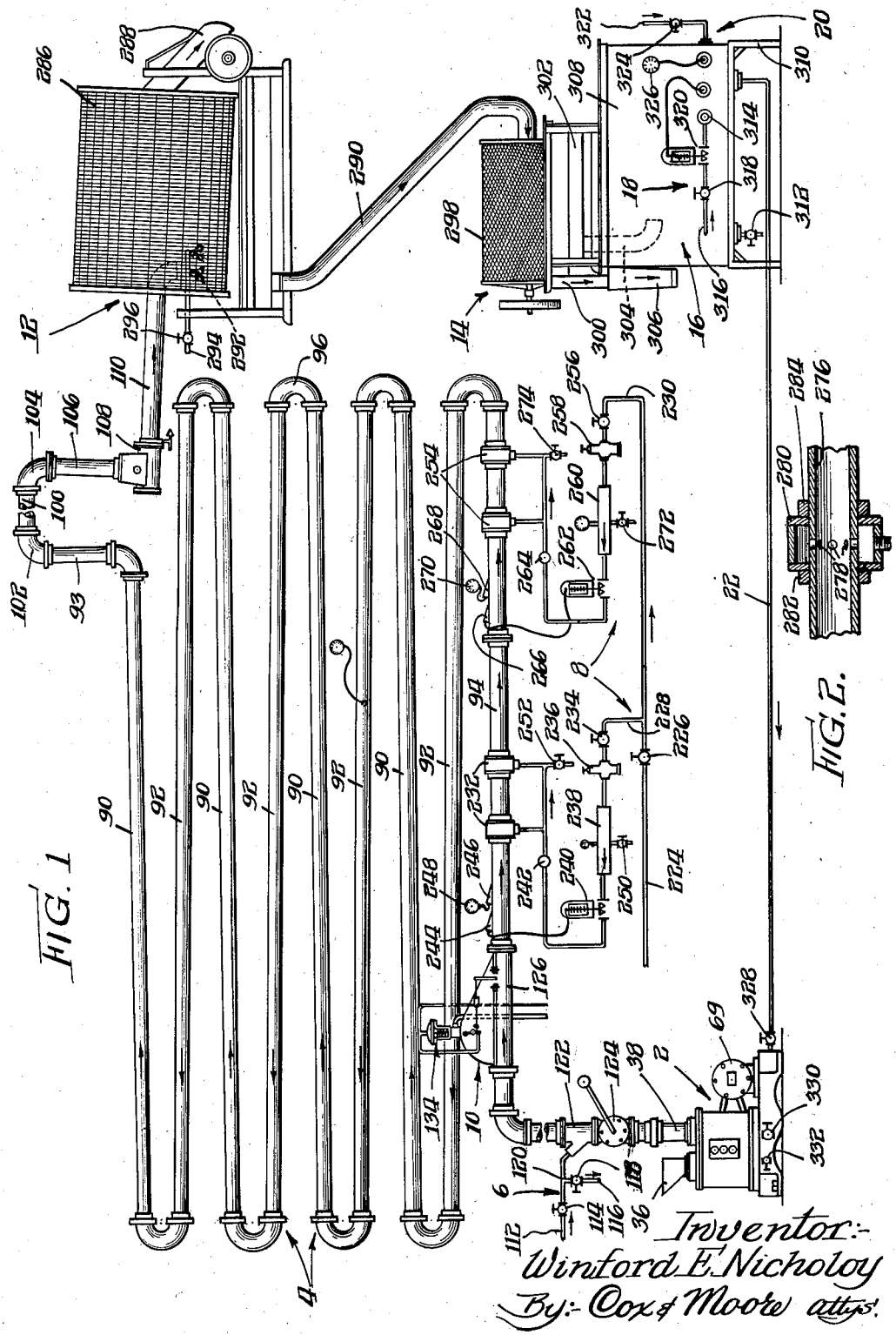

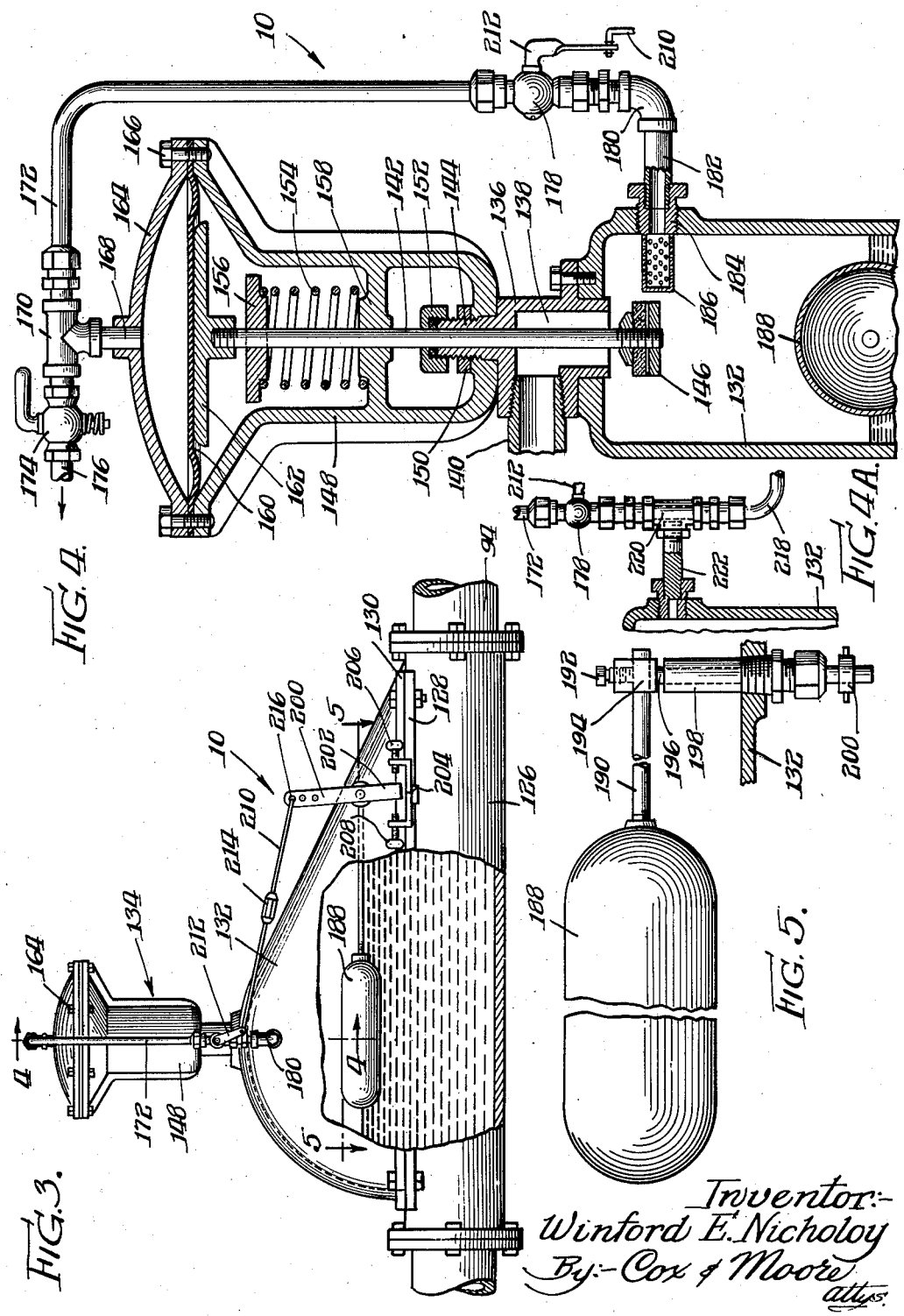

Patented July 22, 1941

2,250,116

UNITED STATES PATENT OFFICE 2,250,116

PROCESS AND APPARATUS FOR TREATING FOOD MATERIALS

Winford E. Nicholoy, Columbus, Ohio, assignor to Scott-Viner Company, Columbus, Ohio, a corporation of Ohio Application December 17, 1937, Serial No. 180,426

17 Claims. (Cl. 146—194)

This invention relates to a process and apparatus for cleansing and preliminarily processing units of food material preparatory to canning and cooking, and more particularly to such process and apparatus for cleansing and heat treating peas prior to canning and cooking.

It is to be understood, of course, that the process and apparatus is equally adapted to the cleansing and processing of articles of food other than peas and including any other vegetables and fruits which it would be advantageous so to treat.

Heretofore, it has been the custom to subject peas to a blanching operation wherein the peas were confined in heated water, which water soon became contaminated because the peas were not thoroughly cleansed before subjecting them to the blanching operation and because the contaminated water was reused and only partially cleansed prior to reuse. This undesirable contamination of the water was further increased because the so-called blancher effected a substantial cooking of the peas, thus liberating in the blancher water the cooking juices from the peas and other matter released from the peas by such cooking.

It is an object of applicant's invention to provide a method of and apparatus for cleansing and blanching food material, particularly peas and the like, for thoroughly cleansing the material prior to blanching, and for blanching the material under carefully controlled conditions of temperature and time so that no cooking of the peas will take place during the blanching step nor in the blanching apparatus.

It is a further object of the invention to provide a process of and an apparatus for cleansing food materials, particularly peas, by means of water into which is injected predetermined amounts of air to produce a turbulence or surging action in the water to thereby remove all contaminating accumulations of foreign matter on the food material being processed.

It is a further object of applicant's invention to provide a method and apparatus for blanching the food material cleansed by the above stated process or apparatus by submerging the food material in a conveying stream of water received from the cleaning apparatus, by eliminating from the conveying water air which was introduced thereinto for the purpose of cleaning the food material and thereafter raising the temperature of the conveying water to a predetermined, carefully controlled value to eliminate the natural gases within the food material and to preserve the natural color, flavor and food value of the food material.

Another object of applicant's invention is to provide means for separating the blanched peas from the blanching and conveying water and for removing from such water all foreign particles and substances whereby the water may be reused for a long period of time without changing.

The invention further contemplates means for readily introducing into the washing and blanching apparatus fresh supplies of water and for draining therefrom the used water.

The invention further contemplates a process and apparatus for blanching in water under hydrostatic or kinetic pressure to drive out the gases within the food particles and to fill the thus evacuated spaces of the food particles with water whereby, in the subsequent treatment and canning of the food particles, the absorption of air or gas into these spaces will be prevented.

A still further object is to provide simple and efficient means for injecting steam or other heated gases into the blanching apparatus in such manner as to maintain the substance being blanched at a predetermined temperature and to provide means to regulate the pressure and emission of steam or heated gases for this purpose.

The invention also contemplates means for removing the air from the liquid in a closed conduit, and particularly to the removing of air, steam or other gas from the conveying and blanching liquid of a pipe blancher.

Other and further objects and advantages of the invention will be apparent from the following description when taken in connection with the accompanying drawings, in which:

Fig. 1 is a diagrammatic representation of a washer and blancher embodying applicant's invention.

Fig. 2 is a fragmentary, horizontal section through the steam injector valve.

Fig. 3 is a view in elevation of the relief portion with a portion of the side wall broken away to show the inner construction.

Fig. 4 is a fragmentary, vertical section taken along the line 4—4 of Fig. 3.

Fig. 4-A is a fragmentary, sectional view similar to Fig. 4 but showing a slight modification.

Fig. 5 is a horizontal section taken substantially along the line 5—5 of Fig. 3.

Fig. 6 is a diagrammatic representation of the washer elevator.

Fig. 7 is a vertical section taken on the line 7—7 of Fig. 8.

Fig. 8 is a horizontal section taken along the line 8—8 of Fig. 7.

In vining peas, there is a certain amount of bruising which sets up a change in the physical properties of the peas similar to that which develops when an apple is bruised. This change has an effect on the flavor. To arrest this flavor change, the peas should be treated in hot water as soon after vining as practicable.

In addition, in vining peas there is a certain amount of vine juice which accumulates on the peas. In fact, an almost air-tight coating around each pea is sometimes the result. This substance should be removed as quickly as possible and hot water is again the best method for doing it. The ideal washing medium for this operation is clean, fresh, hot water. Completely clean hot water is not necessary because water may be reused up to a certain point without any deleterious effect on the commodity. Furthermore, in the processing of peas preparatory to canning, the peas should be thoroughly heated or sufficiently heated to exhaust the gases therefrom so as not only to permit direct separation of qualities in a gravity separator, but also to remove the gases medium between the inner and outer shells, thereby to impart a clear, greener appearance to the peas. Otherwise, the gases will be eliminated after cooking and will thus destroy or partially destroy the desirable vacuum within the can which will, of course, affect the marketability of the product.

In carrying out my improved process, the commodity, in substantially granular or small form, be it raw peas or otherwise, is fed into a conduit, tube, or the like into which air has been introduced; water, into which air has also been injected, is fed under pressure to one end of the conduit, tube or the like, and ejects the peas therefrom into the bottom of an upwardly extending length of closed pipe. The water is at a relatively low temperature, for example, between 140° and 170° F. or about 156° F.

The air in the conduit, tube or the like and the air injected into the water fed thereto under pressure causes a condition of turbulence or foaming of the water to effect a thorough cleansing of the commodity. At an initial point in the length of closed pipe, the air in the water is removed and the commodity passes directly into a first heating zone, at which point steam, under high pressure and of high temperature, is injected directly into the stream of water and commodity, resulting in what might be called "flash" heat treatment. The pressure of the steam at this point is about twenty pounds and the temperature of the steam is about 240°. This flash of heat treatment takes place immediately after the removal of the air from the water. This flash treatment is utilized to avoid any cooking of the commodity and at the same time to apply to the outside of the commodity, if it be raw peas, sufficient heat to cause an expansion of the skin, or whatever the outside section is, thereby to open the pores of the skin or increase the porosity and thus effect the release of any gases.

After passing this first heater unit, the commodity is carried along in the stream of water, during which period part or all of the contained gases are released. To assure absolute liberation of all gases within the commodity, it is subjected to a second flash heat treatment of live steam in a second heating zone. It is not necessary further to apply heat to the commodity until the latter reaches the discharge end of the closed tube. All during the time that the flow is continued in the closed tube the commodity is necessarily under pressure, due to both hydrostatic head and friction head.

Variation in the length of treatment or the effect of the processing, is obtained through an increase or decrease in the speed at which the water is forced through the closed pipe and in the increase and decrease of the amount of heat that is applied to the commodity. Pressure-reducing and regulating valves may be used to alter the pressure and quantity of the steam fed to the closed tube thereby to vary the temperature of the water. In this process, the heat is applied in a relatively short time, thereby avoiding cooking and at the same time preserving the color and flavor of the commodity.

In short, in the present process the heat is applied preferably in the form of steam injection and at one or two separated zones along the course of travel of the hot water carrying the commodity, as distinguished from a continuous application of heat along a substantial length of travel of the commodity. Furthermore, in the present process better results are secured by forcing the water upwardly through the closed tube, as distinguished from a gravity flow downwardly. By forcing the water upwardly through the tube it is under pressure and the tube is solidly full of water and commodity all of the time. At the heating zones steam passes completely around the tubing and is injected into the water circumferentially of the tubing in the form of jets. These jets of steam go into all of the water and onto all of the peas as the peas flow by. In other words, it is a hot blast of steam injected right onto the product.

In certain installations the water is pumped at the rate of about 65 gallons a minute through the tube, and about 12,000 pounds of peas per hour are run through that tube. The total volume of material flowing through the tube comprises about 25 per cent. peas and seventy-five per cent. water, roughly; and at a rate of about 80 to 85 gallons a minute of the combined product.

The steam injected onto the peas does not reach the center of the peas but strikes the skin of the peas, thereby expanding the peas and increasing the porosity of their skins. The water under pressure squeezes the peas and forces out some of the natural gases contained therein. As the peas, thus partially degasified, come to the second flash zone, they are struck by a second hot blast of steam of higher temperature which completes the degasification of the peas and raises the temperature of the entire conveying stream. The peas and the water thus flow on at a relatively higher temperature until the end of the piping is reached.

As the gas is removed and the peas travel toward the discharge end of the tube, the pressure and temperature decrease, the peas expand and the water permeates the peas so that when the peas come out the discharge end of the tube they do not re-absorb gas or air from the atmosphere. It will be evident that if the peas were brought out when the gas is completely exhausted and the spaces formerly occupied by the gases not replaced by water or other medium, there would be a tendency for the air or other gases to enter such spaces. However, by squeezing out the gases and replacing the gases with water, this is avoided.

It will therefore be seen that one of the features of my invention is the application of heat to the peas whereby to increase the porosity of the skin of the peas and make possible the removal of the gases. In other words, the process of my invention includes the steps of eliminating the gases from the peas after the peas are thoroughly washed and then replacing the spaces formerly occupied by the gases with warm water, after which the peas are placed in cans, the cans filled with liquid at or near the boiling point, then sealed and cooked to effect proper and complete sterilization.

Another important feature of my invention resides in the injection of air into the system to create a surging or turbulent washing action. This air is preferably injected into the washer elevator which loads the commodity into the system. It will be evident however that this air may be introduced at other points in advance of the heating means and that other means than the washer elevator may be used for washing and feeding the commodity and liquid into the closed tube blancher.

In order to provide and maintain the proper hydrostatic pressure within the tube or flow line and in order to facilitate the replacement of the gases in the commodity by the water, it is advantageous to provide for air removal. This is preferably accomplished by an air trap and an air release valve means operating automatically at the desired pressure. A minimum pressure of 4 pounds per square inch may be set for the operation of the system; however, it has been found that an operating pressure as high as 16 pounds per square inch is ideal. The system is however so devised that it can operate satisfactorily under most any pressure. The air trap is adjustable for proper operation at any system operating pressure that is desirable. The purpose of this air trap is to remove air from the enclosed stream of water under pressure. For instance, as the air and water pass from the washer elevator upwardly through the closed tube the air immediately rises to the top of a dome of the air trap. The accumulation of air in the dome lowers the water level and allows a float to fall, thereby opening a valve which allows the air to pass out from the dome. As the air escapes, the water level rises and moves the float upwardly to close the valve.

A preferred embodiment of the apparatus forming a part of this invention is shown in Fig. 1. As shown in said figure, the washing and blanching system comprises a washer elevator 2, a closed tube piping system 4, water inlet and drain piping 6 for the piping system 4, a steam inlet controlling and regulating system 8 for the piping system 4, air exhausting means 10, a separating means 12, a second separating means 14, a return reservoir or tank 16, temperature controlled steam inlet means 18 for the return reservoir 16, water supply means 20 for the reservoir and a return water line 22.

The washer elevator 2 (as best shown in Figs. 6 to 8) comprises a cylinder 24 having upper and lower end plates 26 and 28 and a cylindrical wall 30. The upper plate 26 or head of the cylinder is provided with openings 32 and 34, respectively, in alinement with the opening in a commodity feed hopper 36 and the opening of a vertical pipe 38, the hopper 36 and pipe 38 being mounted on and secured to the head 26 by means of fastening rings or the like 40 and 42 bolted to the head 26.

The head 26 is additionally provided at its center with an apertured boss 44 in which is journaled a vertical shaft 46, which shaft is also journaled in the bottom plate 28. The bottom plate 28 is provided with a port or opening 48 in vertical alinement with the opening 34 in the head plate 26.

Disks 50 and 52 are keyed to the shaft 46 at the top and bottom, respectively, of the cylinder 24. Each of these disks is provided with a plurality of (preferably five) openings therethrough and annular flanges surrounding each opening. These openings are spaced angularly about the axis of the shaft 46, the axes of the openings being equi-distantly spaced from the shaft axis, the openings in the bottom disk being alined with the openings in the upper disk.

A plurality of tubes, conduits, pipes or the like 54, 56, 58, 60 and 62 extend between the openings in the upper and lower disks and are received in the annular flanges surrounding these openings. In the bottom of each of these tubes is a semispherical screen 64 for preventing movement of the commodity out of the bottom of the tube but permitting liquid to be injected thereinto or removed therefrom through the screen.

Rotation of the disks 50 and 52 and the tubes 54 to 60 connected thereto is effected by means of an annulus 65 secured to the upper disk 50 and having beveled gear teeth 66 meshing with the teeth of a beveled gear 67 secured to the end of a power shaft 68 which may be driven by the motor (not shown) which also drives the pumps 69 and 78.

To the opening 48 in the base plate 28 is connected the outlet side of a pump 69 by means of a fitting 70. The pump 69 may be of any desired construction, preferably of the intermeshing gear type shown in Fig. 6. The fitting 70 comprises a plate 71 bolted to the base plate 28 and is preferably provided with an axial opening 72 communicating with the outlet of the pump and a radial opening 74 connected by a pipe 76 to the outlet of the pump 78 which is preferably also of the intermeshing gear type, the pump 78 being connected by means of a fitting 80 to an opening 82 in the base plate 28 substantially beneath the tube 58 when said tube is in the position shown in Figs. 6 and 8. The opening 82 is, however, larger than the tube 58 and extends substantially to the edge of the tube 56 when that tube is in the position shown in Figs. 6 and 8. The fitting 80 comprises a base plate 84 bolted to the bottom plate 28 and is provided with a central opening 86 in communication with the outlet of the pump 78.

The top plate 26 is further provided in its under surface with an opening or port 88 extending from a point over the opening 82 to the outer edge of the top plate 26, this opening overlying the tube 58 when in the position shown in Figs. 6 and 8 and being adapted to connect any tube when in this position to atmosphere to permit air to flow into such tube.

The operation of this washer elevator will be later described in connection with the operation of the system.

The closed tube piping system 4 comprises a plurality of pipe sections 90 and 92 and pipe section 94, the pipe sections 90 being inclined from left to right and the pipe sections 92 being inclined from right to left, and each pipe section 90 being connected to a pipe section 92 by a U-shaped pipe or bend 96. The pipe bends 96 may be detachably connected to the ends of the pipes 90 and 92 as by means of bolts passing through annular flanges to permit inspection and cleaning of each of the pipes of the piping system.

The topmost pipe 90 may be connected to a riser pipe 93 connected by a horizontal pipe 100 and bends 102 and 104 to a second riser 106 connected to a control valve 108 for regulating the flow of material from the pipe 106 to a gravity feed pipe 110 emptying into the separating means 12. The bottom pipe section 94 is inclined slightly from left to right and is provided with the air exhausting means 10 located in the initial portion of this pipe section and the steam inlet controlling and regulating system 8.

Water or other washing and conveying liquid is supplied to the pipe system 4 and washer elevator 2 by means of the water inlet and drain piping 6 comprising an inlet pipe 112, a cut-off valve 114, a drain pipe 116 and a cut-off valve 118 in the drain pipe 116. A pipe section 120 connects these cut-off valves to the riser 122 which connects the washer elevator 2 to the pipe section 94 of the piping system 4. The riser 122 may, if desired, be provided with a safety cut-off valve 124 for preventing back flow into the washer elevator in case of a shut down of the latter.

The air exhausting means 10, which forms an important part of applicant's invention, is best illustrated in Figs. 3 to 5. As shown in these figures, this air relief means 10 comprises a pipe section 126 interposed in the pipe section 94, the pipe section 126 being provided with a longitudinal opening enclosed by a rectangular flange 128 extending tangentially to the cylindrical portion of the pipe section. To the flange 128 is bolted a flange 130 of a hollow, dome-shaped member or casting 132 in communication with the interior of the pipe section 126 by means of the longitudinal opening defined by the flange 128. On top of the dome 132 is mounted a pressure operated valve 134.

The pressure operated valve 134 preferably comprises a base fitting 136 bolted to the dome 132 and provided with an opening 138 in communication with the interior of the dome and in communication with the opening of an exhaust pipe 140. A valve rod 142 is slidably mounted in the cylindrical threaded portion 144 of the fitting 136 and is provided at its lower end with a valve head 146 adapted to open and close the opening 138 to and from communication with the dome 132. The portion 144 of the fitting 136 is threadedly received in the base of the bowl 148 of the valve, being clamped relative thereto by a lock nut 150. Packing means 152 for the valve rod 142 is carried at the upper end of the portion 144 of the fitting 136 and prevents the entrance of air or steam into the bowl 148.

The valve head 146 is normally urged into closed position with respect to the opening 138 by means of a helical spring 154 surrounding the upper portion of the rod and interposed between a collar 156 secured adjacent the upper end of the rod and an integrally formed wall 158 in the bowl 148. The valve rod and head are moved in the opposite direction by a pressure responsive diaphragm 160 connected to the rod 142 by a disk 162 engaging the under surface of the diaphragm and threaded on the upper end of the rod 142. The diaphragm 160 is bolted to the upper open end of the bowl 148 by means of a dome-shaped cover 164 and bolts 166 passing through the annular flange of said cover and threadedly received in the annular flange of the bowl 148.

Fluid for operating the diaphragm 160 is supplied between the upper surface of the diaphragm and the cover 164 through a pipe 168 secured centrally to the cover 164 and in open communication with the space between the cover and the diaphragm. The pipe 168 is connected by a T 170 to a pipe 172 and a diaphragm pressure relief valve 174 in an exhaust pipe line 176. The pipe 172 is provided with an automatically operated cut-off valve 178 joined by a bend 180 to a pipe 182 secured to the side of the dome 132 and into communication with the interior of said dome. The fitting 184 by which the pipe 182 is connected to the interior of the dome 132 is preferably provided with a filter screen 186 to prevent entrance of any foreign matter into the pipe 182, the valve 178 and the pipe 172 and the operating chamber of the diaphragm.

The valve 178 is automatically operated to open and close the pipe 172 by means of a float 188 mounted within the dome 132 on a rod 190 adjustably secured by a set screw 192 within a suitable opening provided in the enlarged rectangular end portion 194 of a shaft 196. The shaft 196 is journaled in a sleeve 198 threadedly received in a suitable opening in a side wall of the dome 132. The shaft 196 extends outwardly of the dome and has secured to its outer end a lever 200 having a downwardly extending end portion 202 movable between the upstanding lugs of a U-shaped bracket 204 secured to the flanges 128 or 130 and provided with set screws 206 and 208 carried by the upstanding lugs of the bracket. The set screws 206 and 208 are adjusted as desired to predetermine the movements of the lever 200. The lever 200 is connected by a link 210 to a lever 212 secured to the operating stem of the valve 178. The link 210 is adjustable in length by a turn buckle 214 and the lever 200 is provided with a plurality of openings 216 by means of which the point of connection of the link 210 to said lever may be adjusted as desired.

The rod 190, the set screws 206 and 208, the link 210 and the point of connection of this link with the lever 200 are so adjusted that when the float 188 is in its lowest position the valve 178 will be wide open and when the float is in its highest position the valve 178 will be entirely closed. The operation of this air relief means 10 is substantially as follows. As the air and water pass into the pipe section 126, the air rises to the top of the dome 132 while water passes on through the pipe section 94. The accumulation of air in the dome lowers the water level therein and allows the float 188 to fall. The float in lowering rotates the lever 200 counterclockwise (as seen in Fig. 3) and this causes a clockwise rotation of the valve lever 212 thereby opening the valve 178. Air from the dome 132 then passes through the screen 186, the pipe 182, bend 180, the valve 178, the pipe 172, the T 170 and pipe 168 into the space between the cover 164 and the diaphragm 160. The diaphragm 160 is depressed thereby to cause the valve rod 142 and valve head 146 to be moved downwardly thereby opening the port 138 and establishing communication between the dome 132 and the exhaust pipe 140. As the air is released from the dome, the air between the diaphragm 160 and the cover 164 is at a higher pressure and accordingly flows backwardly in the pipe 172 to the dome 132 and out of the exhaust pipe 140, thereby reducing the pressure acting on this diaphragm and allowing the valve rod 142 and valve head 146 to be moved upwardly by the returning spring 154. As the pressure in the dome 132 decreases because of the removal of air, the water level rises therein causing the float 188 to operate the lever 200, the link 210 and the lever 212 to close the valve 178. If air above atmospheric pressure is trapped in the pipe 172 or the valve chamber above the diaphragm 160, it may escape through the regulated valve 174 to atmosphere, thereby insuring the full seating of the valve head 146 in the entrance end of the port 138.

In one embodiment of the invention, the diaphragmatic relief valve may be operated from an independent source, as for example, by means of steam supplied through a pipe 218 connected to a T 220 joined to the valve 178 and pipe line 172. The T 220 may be supported on the dome 132 as by means of a solid stud 222 threaded in a suitable opening in the side of the dome. It will be evident that in this form the cut-off valve 178 controls the connection of the source of fluid under pressure to the upper side of the control diaphragm 160 in response to the pressure of the air accumulated in the dome 132.

Release of the operating pressure is effected through the throttle valve 174 so that within a predetermined interval of time after the cut-off valve 178 has been operated, the spring 154 may return the valve head 146 to closed position.

The steam inlet controlling and regulating system 8 comprises a steam supply pipe 224 having a cut-off valve 226 and two or more branch lines 228 and 230. The pipe 228 supplies steam to one or more steam injectors 232 located in the pipe section 94 at an initial portion thereof but following the air exhausting means 10. The pipe 228 is provided with a cut-off valve 234, a pressure reducing valve 236 for automatically maintaining the steam pressure in the pipe at the desired predetermined value, a condensate removing and temperature measuring device 238, a temperature controlled valve 240, and an orifice 242 for controlling the velocity of the steam supplied to the injectors.

The temperature responsive element 244 for controlling the valve device 240 is preferably located in advance of the injectors 232 to control the amount of steam injected in accordance with the temperature of the conveying and blanching liquid feeding into the injectors.

A like temperature responsive member 246 located in the pipe section 94 adjacent the member 244 operates an indicating or recording meter 248. A drain valve 250 is associated with a condensate removing and temperature measuring device 238 and a similar, normally closed drain or exhaust valve 252 is connected to the pipe 228 at a point below the connection of the last injector 232. The branch pipe 230 is connected to one or more injectors 254 connected in the the pipe section 94 or a subsequent pipe section, at a point a predetermined distance from the injector or injectors 232.

The pipe 230, similarly to the pipe 228, is provided with a cut-off valve 256, a pressure reducing valve 258, a condensate removing and temperature measuring device 260, a temperature controlled valve 262, and an orifice 264. The temperature controlled valve device 262 is controlled by a temperature responsive member 266 which is positioned in advance of the injectors 254. A similar temperature responsive member 268 controls an indicating or recording meter 270. Drain and exhaust valves 272 and 274, similar to the drain and exhaust valves 250 and 252, are associated with the condensate removing device 260 and the branch pipe 230.

Each of the steam injectors 232 and 254 comprises (as best shown in Fig. 2) a center pipe portion 276 which may be a portion of the pipe section 94 or may be a separate section of pipe interposed in and bolted to the pipe section 94. This pipe 276 is provided with a plurality of angularly spaced, radially extending openings or jets 278 and a cylindrical steam box or jacket 280 surrounds the pipe portion 276 and encloses the openings or jets 278. The jacket 280 may be secured to the pipe portion 276 by collars or nuts 282 and 284 bolted to or threaded on said pipe portion. The steam supply branch pipe 228 or the branch pipe 230 is connected directly to the interior of the steam jacket 280.

It will be evident that the steam inlet controlling and regulating system 8 supplies a properly regulated and controlled amount of steam at a predetermined constant pressure to each of the injectors 232 and 254 and that by means of the jets 278 in each of these injectors, the steam is directly injected into the flowing mass of the commodity and conveying and blanching liquid. Because the blanching is accomplished under pressure varying from substantially atmospheric pressure at the discharge end of the system to a relatively large value in the pipe section 94, the amount, temperature and pressure of the steam supplied to the injectors may be such that the temperature of the mass of commodity and blanching liquid in the pipe section 94 may be raised above the normal boiling point of the liquid at atmospheric pressure without, however, effecting any cooking of the commodity. A temperature of 240° in the discharging end of the pipe section 94 has been found satisfactory.

The blanching of the commodity at this high temperature materially shortens the time required for effecting the proper blanching of a commodity and necessarily speeds up the canning process which has been heretofore mainly dependent upon the time required to pass the commodity through the blanchers.

The separating means 12 preferably comprises a cylindrical rotating screen 286 for receiving the commodity and the blanching and conveying liquid from the pipe 110 and for separating the commodity from the liquid, the commodity being fed from the rotating screen onto an inclined chute, flume or pipe 288 and the blanching and conveying liquid being fed to a discharge pipe 290. A spray 292 located within the separating screen 286 is supplied with warm water through a pipe 294 in which is interposed the cut-off valve 296. The spray 292 effects a further cleansing of the peas and constantly supplies a constant amount of fresh water to the system.

The separating means 14 preferably comprises a cylindrical, rotating screen 298 of finer mesh than the screen 286 and receives discharge from the pipe 290. The screen 298 removes from the discharge of the pipe 290 all solids and foreign substances, except the very finest particles, these substances being discharged into the pipe 300 which is also connected to an overflow pipe (not shown) for a tank 302 mounted beneath the screen 298. Fine particles of foreign matter collect on the surface of the water in the tank 302 and are drained therefrom by the overflow pipe connected to the discharge pipe 300. From the tank 302 the water is returned to the return reservoir or tank 16 by a pipe 304. A discharge pipe 306, which may receive the discharge from the pipe 300, is also connected to an overflow pipe (not shown) for skimming any foamy or sudsy material connected on the surface of the water in the return reservoir 16.

The return reservoir or tank 16 may comprise a tank structure 308 supported on a frame 310 and provided with a drain valve 312. The steam inlet means 18 preferably comprises a steam connection 314 to the tank 308, steam being supplied thereto by a supply pipe 316 in which are interposed a cut-off valve 318 and a temperature controlled valve 320.

The water supply means 20 for the return reservoir or tank 16 comprises a supply pipe 322 in which is interposed a cut-off valve 324.

A temperature responsive member (not shown) is connected to an indicating or recording meter 326 for registering the temperature of the water in the return reservoir or tank 16. The bottom of the tank 308 is connected by the return pipe 22, in which is interposed a cut-off valve 328, to the inlet side of the pump 69.

The operation of the system is substantially as follows. The valve 114 is first opened to fill the entire system with water from the supply pipe 112 and, the system having been filled, the valve 114 is then closed. The steam valves 226, 234 and 256 are then opened to supply steam at the pressure predetermined by the setting of the pressure reducing valves 236 and 258 to the injectors 232 and 254. The washer elevator 2 is then started and the steam valve 318 for supplying steam to the return reservoir is opened as is also the valve 296 for supplying water to the spray 292 and the valve 328 for supplying water from the return reservoir to the pump 69.

The operation of the system shall be hereinafter referred to in connection with its use for washing and blanching peas.

The peas are fed into the hopper 36 of the washer elevator 2 and water is fed thereto from the return pipe 22 by means of the pump 69. The tube, which at the charging instant is beneath the hopper 36, has been previously supplied with air through the ports 88 and an additional amount of air is carried into the tube along with the peas. From the charging position, the tube rotates to a position in alinement with the pipe 38 and the opening 48, in which position the water at a predetermined temperature, preferably between 80 and 160° F. is injected under pressure by the pump 69 into the charged tube, effecting a washing of the peas and discharging the same at a relatively high speed out of said tube. The air which had been previously supplied to the tube by the port 88 and along with the peas, and the air supplied in the water injected into the fitting 70 by the pump 78 and the pipe 76, creates a turbulence or foaming of the water, thereby to effect a thorough cleansing of the peas by removing the film of vine juices or other matter surrounding the skins of the peas.

From the discharge position, shown in Fig. 6 as being occupied by the tube 54, the tube passes to the position occupied by the tube 56 in said figure. In moving from this position to the position occupied by the tube 58, the tube passes over the opening 82 and into registry with the port 88. The pump 78 removes the water from the tube as it passes over the opening 82 and also draws into the pump air which is supplied to the tube through the port 88. The water having been removed from the tube in this position and the tube filled with air, it is then moved to the charging position to receive a second charge of peas from the hopper 36.

It will be evident that the operation of the washer elevator is substantially continuous; peas are being loaded into one tube while a second one is being discharged; water is being removed from a third one; water is being removed from and air is being supplied to a fourth one; and the fifth one is moving from charging to discharging position. If desired, the speed of the shaft 68 may be varied in any suitable conventional manner or said shaft may be driven intermittently to increase the charging and discharging periods.

Foreign matter collecting in the bottom of the openings 48 and 82 may be removed through drain valves 330 and 332, respectively (Fig. 1), connected to said openings.

The peas are carried by the washing and conveying liquid under pressure up the riser 122 and into the first pipe section 94, the air which was injected into the water in the washer elevator collecting in the dome 132 of the air exhausting means 10 and being removed therefrom as previously described. The flow in the piping system 4 is so regulated as to volume and speed as to maintain the piping system substantially full of liquid, this flow being regulated by controlling the speed of operation of the pump 69.

From the air exhaust means 10, the water and peas pass along the pipe 94 into the first heating zone, in which zone steam is injected through the jets 278 of the steam injectors 232 directly into the mass of peas and water. This injection of steam effects a flash treatment of the peas to raise the temperature of the blanching water and to partially degasify the peas as heretofore described. The mass of partially degasified peas and water then flows into a second heating zone in which steam is again injected through the jets 278 of the steam injectors 254, this second injection of steam further raising the temperature of the blanching water, completing the degasification of the peas and initiating the substitution of water within the peas for the removed gases.

From the pipe section 94, the mass of the peas and blanching water is forced under a temperature and pressure which constantly decrease as the peas and blanching water pass upwardly therethrough. The U-shaped section of the piping system, represented by the risers 93 and 106 and the horizontal portion 108, acts as a trap regulating the flow of the peas and liquid into the gravity discharge pipe 110.

The peas and water discharged from the pipe 110 are separated by the separating means 12 as heretofore described, the separated peas being fed by the chute, pipe or flume 288 to the subsequent canning apparatus, and the water being returned by the pipe 290 to the separating screen 298. The screen 298 removes foreign matter from the discharge water, which then passes into the tank 302 where it is further cleansed by skimming off the suds or foam formed by minute particles of foreign matter. From the tank 302 the return water passes into the tank 308 of the return reservoir 16 where it is still further cleansed by skimming off the suds or foam of foreign matter. The water from the tank 308, being thus thoroughly cleansed, is then returned by the pipe 22 to the pump 69.

The temperature in the return tank is maintained at a predetermined, desired value between 80 and 160° F. by the temperature controlled steam valve 320.

Fresh supplies of water over and above that supplied by the spray 292 may be fed into the tank 308 through the water supply pipe 322 controlled by the valve 324.

It will be evident from the foregoing description that applicant has provided an efficient method and apparatus for cleansing and blanching food material, particularly peas and the like, in which and by which the material is thoroughly cleansed prior to blanching and the material is blanched under carefully controlled conditions of temperature and time so that no cooking of the peas takes place during the blanching step nor in the blanching apparatus.

Changes may be made in the form, construction and arrangement of the parts without departing from the spirit of the invention or sacrificing any of its attendant advantages, and the right is hereby reserved to make all such changes as fairly fall within the scope of the following claims.

Having thus described my invention, what I claim as new and desire to secure by Letters Patent is as follows:

1. A process for treating a food commodity, comprising feeding a washer fluid to a washer station, injecting another fluid into the said washing fluid to create a condition of turbulence in said washing fluid, and then introducing and submerging the commodity in said turbulent mixture to effect a thorough cleansing of the commodity by the turbulence of the mixture, exhausting the second fluid from the mixture and blanching the commodity in the remaining fluid.

2. A process for treating a food commodity, comprising feeding the commodity to a washer station, feeding a washer fluid to said washer station, injecting another fluid into the said washing fluid to create a condition of turbulence in said washing fluid, then submerging the commodity in said turbulent mixture to effect a thorough cleansing of the commodity, ejecting the commodity and fluid mixture under pressure from the washer station, exhausting the second fluid from the fluid mixture and commodity, conveying the remaining fluid and commodity mixture under pressure to a predetermined point, and thereafter suddenly raising the temperature of the fluid and commodity while being conveyed to blanch the commodity.

3. A process for treating a food commodity comprising injecting a liquid into a vessel, injecting a gas into the liquid in said vessel to create a condition of turbulence in the liquid feeding the commodity into the liquid so that the turbulent liquid effects a cleansing of the commodity, discharging the commodity and liquid from said vessel into a closed blanching vessel, exhausting the gas from the liquid, blanching the commodity in said blanching vessel in said remaining liquid, and discharging the liquid and commodity from said blanching vessel.

4. A process for treating a food commodity comprising injecting water into said vessel, injecting gas into the water in said vessel to create a condition of turbulence in the water feeding the commodity into the water so that the turbulence of the water effects a cleansing of the commodity, discharging the water and commodity under pressure from said vessel into the lower end of a blanching vessel, exhausting the gas from said water at a station adjacent the lower end of said blanching vessel, suddenly injecting a heating medium directly into said water and commodity to expand the commodity and effect a partial degasification of the same, and discharging the water and commodity from said blanching vessel.

5. A process for treating a food commodity comprising the steps of injecting a warm fluid into said vessel, injecting air into said fluid to create a condition of turbulence, loading the commodity into the warm fluid in the vessel so that the turbulence of the fluid effects a thorough cleansing of the commodity within said vessel, discharging the mixture of air, fluid and commodity from said vessel under a predetermined hydraulic pressure, conveying the mixture to a first station, exhausting the air from said mixture at said first station, conveying the fluid and commodity to a second station, injecting steam into said fluid at said second station to raise the temperature thereof and effect a degasification of the commodity, conveying the fluid and commodity under pressure and along a predetermined path to a third station, and separating the fluid and commodity at said third station.

6. A process for treating a food commodity comprising the steps of loading the commodity into a vessel, injecting a warm fluid into said vessel, injecting air into said fluid to create a condition of turbulence, loading the commodity into the warm fluid in the vessel so that the turbulence of the fluid effects a thorough cleansing of the commodity within said vessel, discharging the mixture of air, fluid and commodity from said vessel under a predetermined hydraulic pressure, conveying the mixture to a first station, exhausting the air from said mixture at said first station, conveying the fluid and commodity to a second station, injecting steam into said fluid at said second station to raise the temperature thereof and effect a degasification of the commodity, conveying the fluid and commodity under pressure and along a predetermined path to a third station, separating the fluid and commodity at said third station, returning the fluid to a fourth station, cleansing said fluid at said fourth station, and returning the cleansed fluid under pressure to the first-mentioned vessel.

7. An apparatus for treating a food commodity comprising a vessel for receiving the commodity, a closed tube blancher, means for injecting liquid under pressure into said vessel to eject the commodity into an initial portion of said blancher in a stream of the ejecting liquid, means for injecting air into said liquid prior to its injection into said vessel for causing a surging of the liquid to effect a thorough cleansing of the commodity therein, and means for exhausting the air from the liquid at an initial portion of said blancher.

8. An apparatus for treating a food commodity comprising a vessel for receiving the commodity, a closed tube blancher above said vessel, means for injecting liquid under pressure into said vessel for ejecting the commodity into a lower portion of said blancher in a stream of the ejecting liquid, means for injecting air into said liquid prior to its injection into said vessel for causing a surging of the liquid to effect a thorough cleansing of the commodity therein, means for injecting a heating fluid into an initial section of said blancher and directly into the liquid, and means for exhausting the air from said liquid prior to the injection of the steam.

9. An apparatus for treating a food commodity comprising a vessel for receiving the commodity, a closed tube blancher, means for injecting liquid under pressure into said vessel for ejecting the commodity into a lower portion of said blancher in a stream of the ejecting liquid, means for injecting steam at a first heating zone directly into the liquid to effect a partial degasification of the commodity, and means for controlling the injection of steam in accordance with the temperature of the liquid.

10. An apparatus for treating a food commodity comprising a vessel for receiving the commodity, a closed tube blancher, means for injecting liquid under pressure into said vessel for ejecting the commodity into a lower portion of said blancher in a stream of the ejecting liquid, means for injecting air into said liquid prior to its injection into said vessel for causing a surging of the liquid to effect a thorough cleansing of the commodity therein, means for exhausting the air from said liquid at an initial section of said blancher, and means for injecting steam directly into the liquid at a second section of said blancher.

11. An apparatus for treating a food commodity comprising a vessel for receiving the commodity, a closed tube blancher, means for injecting liquid under pressure into said vessel for ejecting the commodity into a lower portion of said blancher in a stream of the ejecting liquid, means for injecting air into said liquid prior to its injection into said vessel for causing a surging of the liquid to effect a thorough cleansing of the commodity therein, means for exhausting the air from said liquid at an initial section of said blancher, means for injecting steam at a first heating zone directly into the liquid, and means for injecting steam at a second heating zone directly into the liquid.

12. An apparatus for treating a food commodity comprising a vessel for receiving the commodity, a closed tube blancher, means for injecting liquid under pressure into said vessel for ejecting the commodity into a lower portion of said blancher in a stream of the ejecting liquid, means for injecting air into said liquid prior to its injection into said vessel for causing a surging of the liquid to effect a thorough cleansing of the commodity therein, means in said blancher for exhausting the air from said liquid in a section intermediate the ends of the blancher, means receiving the liquid and commodity from said blancher for separating the commodity from the liquid, and means for returning the liquid under pressure to the commodity-receiving vessel.

13. In a blanching system for food commodities of the character described, a closed drum, a unit mounted for rotation within the drum and including a plurality of tubes, a liquid inlet pipe communicating with the bottom of the drum, an outlet and elevator conveyor pipe extending from the top of the drum, said tubes one at a time being adapted to register conjointly with said inlet and said outlet pipes as moved therebetween, means for rotating the unit, means for successively filling the tubes with a gaseous fluid as said unit is rotated, means upon the top of said drum for thereafter successively loading the tubes with the commodity, a source of liquid under pressure adapted to discharge the commodity outwardly from the tubes when the same are disposed between said inlet and outlet pipes, a closed tube blancher having an inlet pipe connected to said outlet and elevator conveyor, and means in an initial section of said closed tube blancher for exhausting the gaseous fluid from the liquid.

14. In a blanching system for food commodities of the character described, a closed drum, a unit mounted for rotation within the drum and including a plurality of tubes, a liquid inlet pipe communicating with the bottom of the drum, an outlet and elevator conveyor pipe extending from the top of the drum, said tubes one at a time being adapted to register conjointly with said inlet and said outlet pipes as moved therebetween, means upon the top of said drum whereby the tubes may be loaded, means for rotating the unit, means for successively filling the tubes with a gaseous fluid as said unit is rotated, a source of liquid under pressure adapted to discharge the commodity outwardly from the tubes when the same are disposed between said inlet and outlet pipes, means for successively withdrawing liquid and air from said tubes and delivering the same under pressure to said inlet to cause a surging of the liquid within the tubes when the same are disposed within said inlet and outlet pipes to effect a thorough cleansing of the commodity, a closed tube blancher having an inlet pipe connected to said outlet and elevator conveyor pipe, and means in an initial section of said blancher for exhausting the air from the liquid.

15. In a machine for blanching peas or the like, a source of liquid under pressure, a casing, a plurality of tubes movable in said casing, closure members approximating the ends of said tubes and having openings therein, one of said openings being restricted, means in communication with one of said openings for filling said tubes, one after another, with peas to be washed and elevated, means in communication with a second of said openings for directing liquid under pressure into said tubes, one after another, means in communication with a third of said openings for discharging the liquid and peas out of said machine, said restricted opening supplying air to said tubes, one after another, a pump in communication with a fourth of said openings to remove liquid and air from said tubes and inject same under pressure into the second of said openings, a closed tube blancher having its inlet connected to said discharging means, and means in an initial section of said blancher for exhausting the air from the liquid.

16. In an apparatus for blanching a food commodity, a closed tube piping system, means for injecting a mixture of liquid and commodity into said piping system, means for discharging the liquid and commodity from said piping system, and means for injecting steam directly into the liquid in said piping system, said means comprising a source of steam, and a cylindrical jacket surrounding a portion of said pipe section for receiving steam from said source, said jacket having opposed end walls apertured to receive and snugly abut the circumferential surface of said pipe portion, said portion of the pipe section having a plurality of circumferentially-spaced, radially extending openings forming jets in communication with said jacket for injecting steam directly into the liquid in said pipe portion.

17. In an apparatus for treating peas or like commodity, means for washing and elevating the peas, a piping system having a plurality of superimposed pipe sections, means for supplying liquid under pressure to said washing and elevating means to wash said peas and inject said peas and liquid into the lower end of said piping system, means for injecting air into said liquid in the washing and elevating means for causing a surging of the liquid to effect a thorough cleansing of the peas therein, means interposed in an initial section of the piping system for exhausting air from said liquid, means in said initial section for injecting a fluid heating medium directly into the liquid and peas for effecting a degasification of the peas, said liquid and peas flowing under constantly decreasing pressure upwardly through the remaining sections of said piping system, means for receiving the mixture of liquid and peas from said piping system for separating the liquid from the peas, a return reservoir for receiving the liquid from said separating means, means for maintaining the liquid in said return reservoir at a predetermined temperature, and means for feeding the liquid from said return reservoir to the liquid supply means.

WINFORD E. NICHOLOY.

CERTIFICATE OF CORRECTION.

Patent No. 2,250,116. July 22, 1941.

WINFORD E. NICHOLOY.

It is hereby certified that error appears in the printed specification of the above numbered patent requiring correction as follows: Page 2, first column, line 28, for the word "gases" read --gaseous--; page 5, first column, line 67, for "the the" read --the--; and second column, line 15, before "276" insert --portion--; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents